United States Patent [19]

Fekl

[11] 4,085,866

[45] Apr. 25, 1978

[54] GRADUATED CONTAINER

[75] Inventor: Werner Fekl, Erlangen, Germany

[73] Assignee: J. Pfrimmer & Co., Erlangen, Germany

[21] Appl. No.: 726,015

[22] Filed: Sep. 22, 1976

[30] Foreign Application Priority Data

Mar. 13, 1976 Germany .............................. 7607842

[51] Int. Cl.$^2$ .............................................. B67D 5/38
[52] U.S. Cl. .................................... 222/158; 222/181
[58] Field of Search ...................... 222/158, 180, 181;
40/310, 319, 317, 324, 16, 16.2; 74/427, 428

[56] References Cited

U.S. PATENT DOCUMENTS

| 265,863 | 10/1882 | Quiggle | 40/310 |
| 1,744,328 | 1/1930 | Morley | 73/427 X |
| 2,720,114 | 10/1955 | Truffa | 73/428 |

FOREIGN PATENT DOCUMENTS

| 961,183 | 6/1964 | United Kingdom | 73/428 |
| 234,612 | 6/1925 | United Kingdom | 73/428 |

Primary Examiner—Stanley H. Tollberg
Attorney, Agent, or Firm—Frank J. Jordan

[57] ABSTRACT

A device for dispensing fluids includes a container which is at least partially transparent to permit viewing of the amount of fluid in the container, the container being arranged to dispense the fluid therefrom at a controlled rate. A scale having indicia thereof for relating the fluid level to a known parameter is initially independent of said container and mounting means are provided for mounting the scale on the container in a position to relate the liquid level in the container to the indicia on the scale according to the known parameter.

1 Claim, 4 Drawing Figures

GRADUATED CONTAINER

BACKGROUND OF THE INVENTION

This invention relates to a container for liquids which is at least partially transparent and which has a scale which indicates the volume of liquid in the container and/or the unit of time or other parameters.

Containers of the type to which this invention relates serve for example, for the storage of infusion liquids. Thus an amount of liquid in the container may have to be infused over a predetermined time as steadily as possible. The length of time during which the liquid should run out of the container varies greatly for each individual case. The regulation of the rate of speed of running out is usually controlled by a valve arrangement, usually a (lever controlled) tubing clamp fastened to the efflux tubing of the container or bottle. This adjustment of the valve is inexact due to the slow dripping speed and varies during the running out, for example, due to the change of height of liquid above the valve. Therefore, the speed of running out has to be checked from time to time particularly, when using special solutions, for example, for parenteral nutrition, where an extremely uniform supply for a prolonged time is needed due to the content of active ingredients. This is necessary because the continual infusion must prevent metabolic overloads concurrent with a building-up of metabolism products or renic losses. Control of outflow of conventionally used infusion bottles which are furnished with solidly affixed divisions and which are conventionally calibrated for volume is only possible by calculating time units from scale units.

Accordingly, an object of the present invention is to provide a container for fluids where the reading of the amount of infused fluid may be made easily and rapidly, and where even at diverse outflow speeds any calculations are obviated.

Another object of the present invention is to provide a container of the aforementioned kind with a graduated scale which is independent from the container and which is connectable to the container by a fastening device. Therefore, for any needed flow-out speed a special scale holder with a scale related to the flow-out speed and the container may be affixed to the container whereby it is possible to directly read down to which graduation line the fluid level should have sunk after a certain time. Corresponding to the level of the fluid in relation to the scale, the valve arrangement may be adjusted if necessary. Generally the container need not be wholly transparent in that, for example, it may be transparent along a longitudinal strip or at least translucent, so that the fluid level may be observed in the vicinity of the scale.

The scale may consist of a small bar, rail, strip, band or the like. Its cross section does not have to be exactly adjusted to the cross section of the container.

In one embodiment of the present invention the scale may be made flexible and capable of conforming to the shape of the container. This is particularly advantageous when the outer wall of the container or bottle is not straight in a longitudinal direction. The capability of the scale to conform prevents mistakes in readout which may arise due to parallaxis.

The connection between the container and the scale may be effected by a fastening device which consists of a guide for receiving a band-shaped scale arranged at the outside of the container. This arrangement provides for easy exchange of scales and a secure fastening to the container.

According to the present invention the scale may be arranged upon the container so that its height may be adjusted. Tolerances are foreseen in the manufacture of containers as well as in the fabrication of closures. Therefore, the level of the fluid does not always occur at the same height. The adjustability as to height of the scale makes it possible to bring the zero line of the scale in accord with the level of the fluid. This is needed for a correct readout of the scale.

According to another characteristic of the present invention the scale may be secured in a fixed position on the outer wall of the container. Thereby an accidental movement of the scale, for example while handling the valve is prevented and unnoticed wrong readout of the data is precluded.

In a further embodiment of the present invention a mounting or fastening means may consist of a clamping device disposed on the outer wall of the container and/or the scale. The clamping device may be placed on a finished container and need not be formed integrally while making the container. This simplifies the manufacture of the container for such a method of mounting. If the container is made from a wholly transparent material and if the clamping device is arranged upon the scale only, then the scale may be arranged at any place upon the circumference of the container, particularly at a place advantageous for reading the scale.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A device for dispensing fluids comprises a container for the fluid, the container being at least partially transparent to permit viewing of the amount of fluid in the container. The container is arranged to dispense the fluid therefrom at a controlled rate. A scale having indicia thereon for relating the fluid level to a known parameter is initially independent of the container, and mounting means are provided to mount the scale on the container in a position to relate the liquid level in the container to the indicia on the scale according to the known parameter.

DESCRIPTION OF THE PREFERRED EMBODIMENTS

Figure 1:
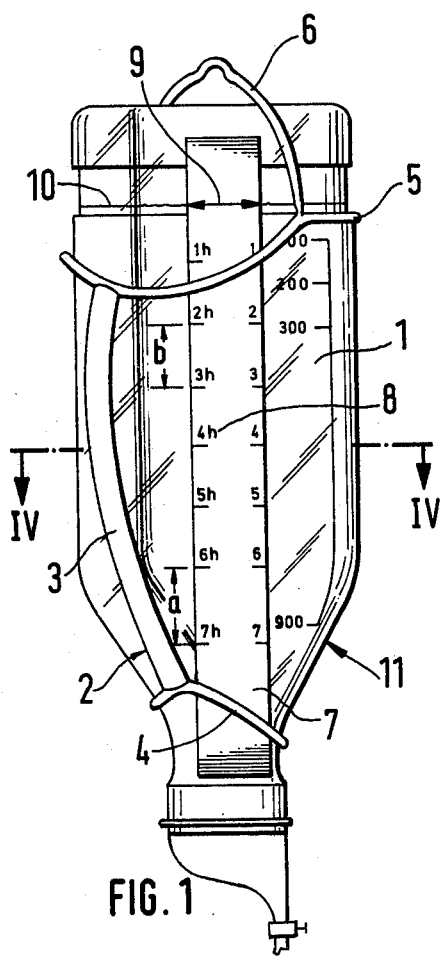
FIG. 1 is an elevational view of a container according to one embodiment of the present invention showing the container in discharge postion.

The container 1 shown in FIG. 1 consists of an infusion bottle which may be made of glass. The container 1 is provided with a mounting 2 made out of flexible plastic which consists of two rings 4,5 connected by a rib 3. Onto the upper ring 5 a flappable loop 6 is integrally connected which serves to hang the container 1 upon a non-illustrated hook.

Underneath both rings 4 and 5 there passes a scale means or strip 7 made out of a flexible material, for example, metal foil, cardboard, or plastic. The strip 7 has a scale 8 which shows on the side of the container 1. The scale 8 is calibrated in hours. The zero line 9 of the scale is marked by a double arrow and is arranged to correspond with the fluid level 10 when the strip 7 is mounted on the container 1. The strip 7 conforms along its whole length to the configuration of the side wall of the container 1. Due to the smaller cross section of the container 1 in the lower zone 11 of the container 1, the distance "a" between the 6th and 7th scale lines is larger than the distance "b" between the rest of the scale lines.

Figure 2:
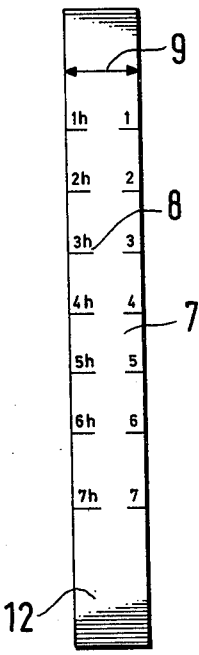
FIG. 2 is an elevation of a scale used with the container of FIG. 1.
Figure 3:
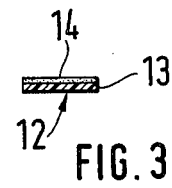
FIG. 3 is a cross sectional view taken through the scale shown in FIG. 2.

The scale means shown in FIGS. 2 and 3 shows on its front 12 the same scale 8 as in FIG. 1, and consists of a strip 13 on the backside of which an adhering strip 14 is arranged. Above the zero line 9 a spot is provided for writing down information, such as the time of day when the infusion process begins. In the most simple case the adhering strip 14 may consist of a layer of adhesive.

Figure 4:
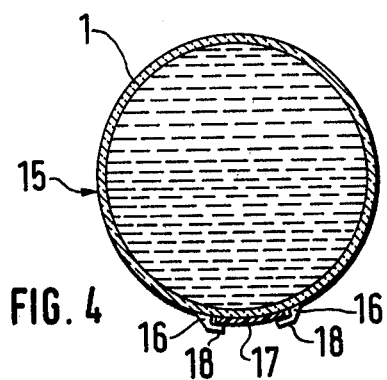
FIG. 4 is a cross sectional view of another embodiment of the present invention taken along a line corresponding to the line IV—IV in FIG. 1.

According to an alternate embodiment as shown in FIG. 4 there is provided on the outer wall 15 of the container 1 two guide ledges 16 which are provided with channels on the side which faces the container 1. The channels extend parallel to each other in a longitudinal direction along the container 1. Between the two guide ledges 16 there is inserted a flexible strip 17 serving as a scale means and which slips under the rim parts 18 of the guide ledges 16 and is thereby held in position on the container 1.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A device for dispensing fluid at a controlled rate, comprising a container for said fluid having means associated therewith for regulating the rate of fluid discharge therefrom, said container being at least partially transparent to permit viewing of the fluid level in the container, a scale means having indicia thereon calibrated in units of time longitudinally thereof and including a zero-time datum marking for relating the changing liquid level within the container to the passage of time, said scale means being initially independent of said container, and mounting means for mounting said scale means on said container so as to extend longitudinally thereof with said zero-time datum marking on said scale means in alignment with the initial fluid within the container to thereby relate changes in the fluid level in the container to the indicia on said scale means, said mounting means comprising a flexible mounting halter including a pair of spaced ring elements adapted to be mounted adjacent opposed ends of the container and a rib connected therebetween, a flappable loop element being connected to one of said ring elements for suspending the container in dispensing position, said ring elements, when the container is suspended in dispensing position, bearing against the scale means to retain same in fixed position relative to the container.

* * * * *